United States Patent
Drewes et al.

(10) Patent No.: US 8,966,989 B2
(45) Date of Patent: Mar. 3, 2015

(54) CAPACITIVE CERAMIC PRESSURE MEASURING CELL AND PRESSURE SENSOR WITH SUCH A PRESSURE MEASURING CELL

(75) Inventors: Ulfert Drewes, Müllheim (DE); Thomas Uehlin, Schopfheim (DE); Elke Schmidt, Bad Säckingen (DE); Andreas Rossberg, Bad Säckingen (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 372 days.

(21) Appl. No.: 13/383,696

(22) PCT Filed: Jun. 22, 2010

(86) PCT No.: PCT/EP2010/058784
§ 371 (c)(1),
(2), (4) Date: Mar. 27, 2012

(87) PCT Pub. No.: WO2011/006741
PCT Pub. Date: Jan. 20, 2011

(65) Prior Publication Data
US 2012/0174681 A1    Jul. 12, 2012

(30) Foreign Application Priority Data
Jul. 15, 2009 (DE) .......................... 10 2009 027 742

(51) Int. Cl.
*G01L 9/12* (2006.01)
*G01L 9/00* (2006.01)

(52) U.S. Cl.
CPC .................................. *G01L 9/0075* (2013.01)
USPC .............................................. 73/718; 73/724

(58) Field of Classification Search
CPC ..... G01L 9/0075; G01L 19/04; G01L 9/0073; G01L 9/0072; G01L 19/0636; G01L 15/00; G01L 9/0047; G01L 9/0042; G01L 13/00; G01L 17/00; G01L 9/12
USPC .................................................... 73/700–756
See application file for complete search history.

(56) References Cited

U.S. PATENT DOCUMENTS

| | | | |
|---|---|---|---|
| 4,178,621 A | 12/1979 | Simonelic et al. | |
| 5,050,034 A | 9/1991 | Hegner et al. | |

(Continued)

FOREIGN PATENT DOCUMENTS

| | | |
|---|---|---|
| DE | 8815425 U1 | 4/1990 |
| EP | 0003387 B1 | 12/1982 |

(Continued)

OTHER PUBLICATIONS

German Search Report in corresponding Application No. 10 2009 027 742.0, dated Jun. 14, 2010.

(Continued)

*Primary Examiner* — Andre Allen
(74) *Attorney, Agent, or Firm* — Bacon & Thomas, PLLC

(57) ABSTRACT

A capacitive pressure measuring cell, including a ceramic platform and a ceramic measuring membrane, which are connected pressure tightly along a joint to form a reference pressure chamber between them. The measuring membrane has a first electrode facing the platform, and the platform has at least a second electrode facing the measuring membrane. The capacitance between the first and second electrodes depends on the difference between a pressure externally acting on the measuring membrane and a pressure reigning in the reference pressure chamber, wherein the joint has a thickness d, which defines an equilibrium distance between the measuring membrane and the front side of the platform. On the front side of the platform, a support layer is arranged, which comprises an inorganic insulator, wherein the support layer has a thickness of at least 0.2, and wherein the second electrode is arranged on the support layer.

14 Claims, 2 Drawing Sheets

(56) References Cited

U.S. PATENT DOCUMENTS

| | | | |
|---|---|---|---|
| 5,400,489 A | 3/1995 | Hegner et al. | |
| 6,968,744 B1* | 11/2005 | Silverbrook et al. | 73/724 |
| 2002/0026836 A1* | 3/2002 | Hegner et al. | 73/717 |
| 2007/0039392 A1* | 2/2007 | Silverbrook et al. | 73/724 |
| 2008/0110269 A1* | 5/2008 | Strietzel et al. | 73/718 |
| 2010/0146771 A1* | 6/2010 | Bertsch et al. | 29/595 |
| 2012/0137785 A1* | 6/2012 | Kopp et al. | 73/753 |
| 2013/0327151 A1* | 12/2013 | Berlinger et al. | 73/756 |

FOREIGN PATENT DOCUMENTS

| | | |
|---|---|---|
| EP | 0373536 A2 | 6/1990 |
| EP | 0445382 B1 | 5/1993 |
| EP | 0544934 A1 | 6/1993 |
| JP | 61010736 A2 | 1/1986 |
| WO | 2011/006741 A1 | 1/2011 |

OTHER PUBLICATIONS

International Preliminary Examination Report in corresponding International Application No. PCT/EP2010/058784, dated Jan. 26, 2012.

International Search Report in corresponding International Application No. PCT/EP2010/058784, dated Sep. 29, 2010.

* cited by examiner

CAPACITIVE CERAMIC PRESSURE MEASURING CELL AND PRESSURE SENSOR WITH SUCH A PRESSURE MEASURING CELL

TECHNICAL FIELD

The present invention relates to a capacitive ceramic pressure measuring cell and a pressure sensor with such a pressure measuring cell.

BACKGROUND DISCUSSION

A basic form of the pressure measuring cell of the field of the invention is disclosed, for example, in European patent application EP 0351701 A2. It includes a measuring membrane and a platform, wherein the measuring membrane is pressure-tightly connected with a peripheral joint made from an active braze, wherein the capacitance between the first and the second electrodes is a measure for the difference between a pressure externally acting on the measuring membrane and a pressure reigning in the reference pressure chamber between the platform and the measuring membrane.

The joint can especially exhibit an active braze, with which a lastingly stable vacuum tight connection between the platform and measuring membrane is achieved.

An advantage of capacitive ceramic pressure measurement cells lies in the fact that they are "dry", which means either ambient air or a vacuum is in the reference pressure chamber, so that, in the case of a breaking of the measuring membrane, which is directly exposed to the measured medium, no contamination of the measured medium via a pressure transfer liquid can occur, which is present in the case of pressure sensors equipped with a pressure transfer means.

Capacitive ceramic pressure measurement cells are usually installed in a housing of a pressure sensor, wherein an O-ring is axially clamped between the housing and the pressure measuring cell. In order to prevent reactions of the axial clamping on the deflection of the measuring membrane, the O-ring should lie on the measuring membrane in the region supported by the peripheral joint. Manufacturing tolerances and mounting tolerances of the O-ring lead to a minimum width for the joint, which, in the case of given outer dimensions of the platform or the pressure measuring cell, reduces the available area for the electrodes, which directly negatively affects the measured capacitance between the electrodes.

In the case of comparatively large measuring cells, this can be tolerable; in the case of more compact structures, however, a further reduction of the electrode surface leads to marked limitations, which is not readily acceptable.

SUMMARY OF THE INVENTION

An object of the present invention is therefore to provide a pressure measuring cell and a pressure sensor, which overcome these disadvantages of the state of the art.

The object is achieved according to the invention by the pressure measuring cell which includes a ceramic platform and a ceramic measuring membrane, wherein the ceramic measuring membrane is pressure-tightly connected along a peripheral joint with a front side of the platform, forming a reference pressure chamber between the platform and the measuring membrane, wherein the measuring membrane has at least a first electrode, which faces the platform, wherein the platform has at least a second electrode, which faces the measuring membrane, wherein the capacitance between the first electrode and the second electrode depends on the difference between a pressure externally acting on the measuring membrane and a pressure existing in the reference pressure chamber, and wherein the joint has a thickness d, which defines an equilibrium distance between the measuring membrane and the front side of the platform, characterized in that, on the front side of the platform, a support layer is arranged, which comprises an inorganic insulator, wherein the support layer has a thickness of at least 0.2 d, and wherein the second electrode is arranged on the support layer.

In a further development of the invention, the support layer comprises glass, wherein, according to a currently preferred embodiment, the glass is free of B2O3, PbO and ZnO. The support layer can especially be applied as a thick layer paste and then fired.

In a further development of the invention, the support layer has a thickness of at least 0.2 d, especially at least 0.25 d, preferably at least 0.275 d.

In a further development of the invention, the electrode comprises a metal material, especially tantalum.

In a further development of the invention, between the second electrode and the support layer, a bonding aid is arranged, especially chromium, nickel-chromium, or titanium-tungsten.

In a further development of the invention, a shielding electrode is arranged between the ceramic material of the platform and the support layer. The shielding electrode can be in galvanic contact with the measuring electrode, especially via the joint.

In an embodiment of the invention, the joint comprises an active braze, especially a zirconium-nickel-titanium active braze.

In a further development of the invention, the material of the measuring membrane comprises an aluminum oxide ceramic with a purity of at least 99.9%.

In a further development of the invention, in the case of overload, the measuring membrane or the first electrode contacts the support layer or the second electrode arranged on the support layer, wherein the maximum bending stress in the measuring membrane in the case of the first contact between the measuring membrane and the support layer or the second electrode amounts to less than, for example, 90%, and preferably less than 80%, of the transverse rupture stress of the membrane material.

In a first embodiment of the invention, the surface of the support layer has a concave shape, which approximates the deflection curve of the measuring membrane, or which corresponds to the deflection curve of the measuring membrane.

In a second embodiment of the invention, the support layer has an essentially planar surface.

The pressure sensor of the invention includes a pressure measuring cell of the invention, a housing, which has in its interior a pressure measuring cell chamber, in which the pressure measuring cell is arranged, and a clamping apparatus, wherein the housing has a housing opening, through which the measuring membrane is contactable with a medium, wherein the housing opening has an annular shoulder extending radially inwards, which serves as a sealing surface, wherein a sealing ring is clamped axially between the sealing surface and the measuring membrane, wherein the pressure measuring cell is clamped axially between the clamping apparatus (which acts on a rear side of the platform of the pressure measuring cell facing away from the measuring membrane) and the sealing ring. The sealing ring preferably sits completely on a region of the measuring membrane supported by the joint.

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

Figure 1:
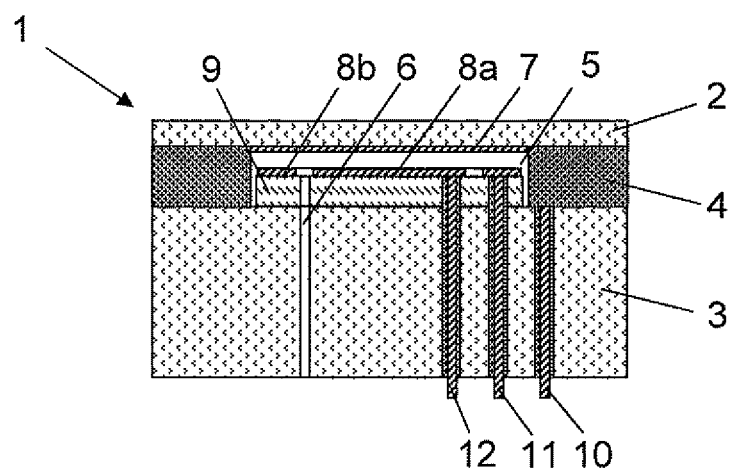
FIG. 1 is a longitudinal section through a pressure measuring cell of the invention.

The pressure measuring cell 1 shown in FIG. 1 includes a circular disk shaped measuring membrane 2 of aluminum oxide with a diameter of less than 20 mm and a material thickness of, for instance, 100 micrometers. The material of the measuring membrane has a purity of more than 99.9% with respect to the mass of the material. The pressure measuring cell furthermore includes a platform 3 made of aluminum oxide with a material thickness of, for example, 8 mm, wherein platform 3 and the measuring membrane 2 are joined by means of an active braze, or hard solder, 4 in a vacuum process, wherein the distance between measuring membrane 2 and platform 3 is set via the material thickness of the joint 4. Such distance can lie, for example, between 20 and 25 micrometers. As is still to be explained in the following, for the joint 4, a minimum width is required, from which results an inner diameter of the joint of, for example, 10 to 12 mm. Between measuring membrane 2 and platform 3, via the pressure tight connection by means of the joint 4, a reference pressure chamber 5 is formed, which is evacuated in the case of absolute pressure sensors, and which, in the present example of an embodiment, is contactable via a duct 6 with atmospheric pressure, wherein the duct 6 extends from a rear side of the platform 3 facing away from the measuring membrane 2 through the platform into the reference pressure chamber 5.

The surface of the measuring membrane 2 facing the platform has a metal electrode 7, which is deposited on the measuring membrane in a material thickness of less than 0.5 micrometers, and which is in galvanic contact with the joint 4. Opposite the first electrode 7, an electrode arrangement with a second electrode 8a and a third electrode 8b is firmly connected with the platform, wherein the third electrode 8b surrounds the second electrode 8a in a ring-shaped manner. The second and the third electrode likewise have a metal material, especially tantalum, which is deposited in a thickness of less than 0.5 mm. The electrodes are contacted via metal pins, especially tantalum pins 10, 11, 12, which are affixed and sealed by means of an active hard solder in bores, which extend from the rear side of the platform into the interior of the pressure measuring cell. In such case, it should also be noted that the contacting of the first electrode occurs via the joint 4 of active hard solder, especially a zirconium-nickel-titanium active hard solder. In order to increase capacitance between the first electrode 7 and the second electrode 8a and the third electrode 8b, the surface of the platform 3 facing the measuring membrane is provided with a support layer 9 of glass in a thickness of, for instance, 7 micrometers. The second electrode 8a and the third electrode 8b are then deposited on such support layer 9.

Insofar as the pressure dependent deformation of the measuring membrane 2 is greater in its central region than in its periphery, the capacitance between the second electrode 8a and the first electrode 7 has a greater pressure dependence than the capacitance between the third electrode 8b and the first electrode 7. By comparison of the capacitances, the cross sensitivity of the pressure measuring cell of the invention with respect to the temperature can be minimized. This is noticeable to the extent that the material thickness of the joint naturally has a temperature dependence, whereby the distance between the electrodes is changed, which, in turn, effects a capacitance change.

Figure 2:
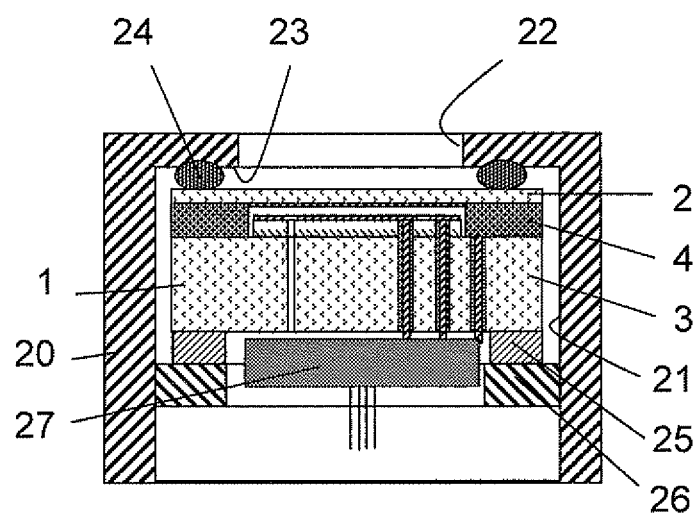
FIG. 2 is a longitudinal section through a pressure sensor of the invention.

The pressure sensor shown in FIG. 2 includes the pressure measuring cell 1 from FIG. 1 in a housing 20, wherein the pressure measuring cell 1 is arranged in a measuring cell chamber 21 in the interior of the housing. The housing 20 includes an opening 22 to the measuring cell chamber 21, wherein the opening 22 is bordered by a radially extending shoulder, which serves as sealing surface 23. A sealing ring 24 is clamped axially between sealing surface 23 and measuring membrane 2, wherein the pressure measuring cell 1 is clamped axially against the sealing ring 24 by means of a screw-in ring 26, which engages in a screw thread (not shown here) in the wall of the housing 20. Between the threaded ring 26 and the rear side of the pressure measuring cell, a decoupling ring 25 is provided, which likewise has a ceramic material, especially aluminum oxide. The measuring electrodes are connected via the above described feedthroughs to an evaluation circuit 27, in which a processing of the capacitance signals occurs, wherein the circuit can either directly output a pressure measurement value to a control system, or can forward the processed signals for additional evaluation to a main electronics of a measurement transmitter (not shown here).

The invention claimed is:

1. A capacitive, ceramic, pressure measuring cell, comprising:
    a ceramic platform; and
    a ceramic measuring membrane, which is pressure tightly connected along a peripheral joint with a front side of said platform, forming a reference pressure chamber between said platform and said measuring membrane, wherein:
    said measuring membrane has at least a first electrode, which faces said platform;
    said platform has at least a second electrode, which faces said measuring membrane;
    the capacitance between said first electrode and said second electrode depends on a difference between a pressure externally acting on said measuring membrane and a pressure existing in said reference pressure chamber;
    said joint has a thickness, which defines an equilibrium distance between said measuring membrane and the front side of said platform;
    on the front side of said platform, a support layer is arranged, which comprises an inorganic insulator;
    said support layer has a thickness of at least 0.2 times said thickness of said joint; and
    said second electrode is arranged on said support layer.

2. The capacitive, ceramic, pressure measuring cell as claimed in claim 1, wherein:
    said support layer comprises glass.

3. The capacitive, ceramic, pressure measuring cell as claimed in claim 1, wherein:
    said support layer has a thickness of at least 0.25 times said thickness of said joint, preferably at least 0.275.

4. The capacitive, ceramic, pressure measuring cell as claimed in claim 1, wherein:
    said electrodes comprise a metal material, especially tantalum.

5. The capacitive, ceramic, pressure measuring cell as claimed in claim 1, wherein:
between said second electrode and said support layer, a bonding aid is arranged, especially chromium, nickel-chromium, or titanium-tungsten.

6. The capacitive, ceramic, pressure measuring cell as claimed in claim 1, further comprising:
a shielding electrode arranged between the ceramic material of said platform and said support layer.

7. The capacitive, ceramic, pressure measuring cell as claimed in claim 1, wherein:
said measuring membrane comprises an aluminum oxide-ceramic with a purity of at least 99.9%.

8. The capacitive, ceramic, pressure measuring cell as claimed in claim 1, wherein:
in case of an overload, said measuring membrane or said first electrode contacts said support layer or said second electrode arranged on said support layer.

9. The capacitive, ceramic, pressure measuring cell as claimed in claim 8, wherein:
the maximum bending stress in said measuring membrane in case of a first contact between said measuring membrane and said support layer or said second electrode amounts to less than 90%, preferably less than 80%, of the transverse rupture stress of said membrane material.

10. The capacitive, ceramic, pressure measuring cell as claimed in claim 1, wherein:
a surface of said support layer has a concave shape, which approximates a deflection curve of said measuring membrane, or which corresponds to the deflection curve of said measuring membrane.

11. The capacitive, ceramic, pressure measuring cell as claimed in claim 1, wherein:
said support layer has an essentially planar surface.

12. The capacitive, ceramic, pressure measuring cell as claimed in claim 1, wherein:
said joint comprises an active braze, especially a zirconium-nickel-titanium active braze.

13. The pressure sensor, comprising:
a ceramic platform; and
a ceramic measuring membrane, which is pressure tightly connected along a peripheral joint with a front side of said platform, forming a reference pressure chamber between said platform and said measuring membrane, wherein:
said measuring membrane has at least a first electrode, which faces said platform;
said platform has at least a second electrode, which faces said measuring membrane;
the capacitance between said first electrode and said second electrode depends on a difference between a pressure externally acting on said measuring membrane and a pressure existing in said reference pressure chamber;
said joint has a thickness, which defines an equilibrium distance between said measuring membrane and the front side of said platform;
on the front side of said platform, a support layer is arranged, which comprises an inorganic insulator;
said support layer has a thickness of at least 0.2 times said thickness of said joint; and
said second electrode is arranged on said support layer;
a housing, which has in its interior a pressure measuring cell chamber, in which the pressure measuring cell is arranged; and
a clamping apparatus, wherein:
said housing has a housing opening, through which said measuring membrane is contactable with a medium;
said housing opening has an annular shoulder extending radially inwards, which serves as a sealing surface;
a sealing ring is clamped axially between said sealing surface and said measuring membrane;
said pressure measuring cell is clamped axially between the clamping apparatus which acts on a rear side of the platform of said pressure measuring cell facing away from said measuring membrane and said sealing ring.

14. Pressure sensor as claimed in claim 13, wherein:
said sealing ring sits completely on a region of said measuring membrane supported by said joint.

\* \* \* \* \*